(12) United States Patent
Chen et al.

(10) Patent No.: US 11,386,822 B1
(45) Date of Patent: Jul. 12, 2022

(54) BD CELL DISPLAY PANEL, MANUFACTURING METHOD AND DRIVING METHOD THEREOF, AND DISPLAY DEVICE

(71) Applicants: Fuzhou BOE Optoelectronics Technology Co., Ltd., Fujian (CN); BOE Technology Group Co., Ltd., Beijing (CN)

(72) Inventors: Jinfeng Chen, Beijing (CN); Nani Liu, Beijing (CN); Yifeng Su, Beijing (CN); Xiaoli Kong, Beijing (CN); Qibiao Lin, Beijing (CN); Xuening Zhao, Beijing (CN); Weiming Yu, Beijing (CN); Wenjian Yao, Beijing (CN); Zhe Huang, Beijing (CN)

(73) Assignees: Fuzhou BOE Optoelectronics Technology Co., Ltd., Fuzhou (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/513,611

(22) Filed: Oct. 28, 2021

(30) Foreign Application Priority Data

Feb. 24, 2021 (CN) .......................... 202110207206.1

(51) Int. Cl.
| | | |
|---|---|---|
| G02F 1/1333 | (2006.01) | |
| G09G 3/20 | (2006.01) | |
| G09G 3/00 | (2006.01) | |
| G09G 3/36 | (2006.01) | |

(52) U.S. Cl.
CPC ........... *G09G 3/007* (2013.01); *G09G 3/3611* (2013.01); *G02F 1/133342* (2021.01); *G09G 2320/0238* (2013.01); *G09G 2320/0285* (2013.01); *G09G 2320/0686* (2013.01); *G09G 2340/0457* (2013.01)

(58) Field of Classification Search
CPC ................. G09G 3/007; G09G 3/3611; G09G 2320/0238; G09G 2320/0285; G09G 2320/0686; G09G 2340/0457; G09G 2300/023; G02F 1/133342
See application file for complete search history.

(56) References Cited

U.S. PATENT DOCUMENTS

| | | | | |
|---|---|---|---|---|
| 2009/0147186 A1* | 6/2009 | Nakai | ................. | G02F 1/13471 345/89 |
| 2013/0342512 A1* | 12/2013 | Smith | ................. | G09G 3/3406 345/204 |
| 2018/0329250 A1* | 11/2018 | Stoller | ................. | G02F 1/1347 |
| 2019/0278118 A1* | 9/2019 | Shao | ................. | G02F 1/13471 |

\* cited by examiner

*Primary Examiner* — Sanghyuk Park
(74) *Attorney, Agent, or Firm* — IPro, PLLC (57) ABSTRACT

The present disclosure discloses a BD cell display panel, a manufacturing method and a driving method thereof, and a display device. The BD cell display panel includes a main cell and a sub cell which are stacked, an XPCBA plate and a control plate. The control plate is configured to read the pixel offset amount and the mura compensation data from the XPCBA plate, and adjust at least one of the first display area and the second display area according to the pixel offset amount, thus causing pixels in the first display area and the second display area that are orthogonally projected within an actual display area of the BD cell display panel to be displayed, and compensating for the mura in the main cell and the sub cell according to the mura compensation data.

20 Claims, 7 Drawing Sheets

Alignment mark

BD CELL DISPLAY PANEL, MANUFACTURING METHOD AND DRIVING METHOD THEREOF, AND DISPLAY DEVICE

CROSS REFERENCE TO RELATED APPLICATIONS

The present disclosure claims priority to Chinese Patent Application No. 202110207206.1 filed with the China National Intellectual Property Administration on Feb. 24, 2021, the entire contents of which are incorporated herein by its reference.

FIELD

The present disclosure relates to the field of display technology, and in particular to a BOE Dual cell (BD cell) display panel, a manufacturing method and a driving method thereof, and a display device.

BACKGROUND

Due to the process capability of equipment, large-sized display panel products often show large-area bulk mura, a dividing line is 1-2 pixels wide in a vertical or horizontal direction, and there is a brightness difference on both sides.

SUMMARY

Embodiments of the present disclosure provide a BD cell display panel, a manufacturing method and a driving method thereof, and a display device.

In a first aspect, an embodiment of the present disclosure provides a BD cell display panel including a main cell including a first display area; a sub cell stacked on the main cell, wherein the sub cell including a second display area; an X-printed circuit board assembly (X-PCBA) plate on a side of the sub cell away from the main cell, wherein the X-PCBA plate is bound with the main cell and the sub cell by a chip on film (COF), and stores a pixel offset amount and mura compensation data, the pixel offset amount is a quantity of pixels misaligned by the first display area with the second display area after the main cell is fitted with the sub cell, and the mura compensation data is data that compensates for mura in the main cell and the sub cell; and a control plate configured to read the pixel offset amount and the mura compensation data from the XPCBA plate, and adjust at least one of the first display area and the second display area according to the pixel offset amount, thus causing pixels in the first display area and the second display area that are orthogonally projected within an actual display area of the BD cell display panel to be displayed, and compensating for the mura in the main cell and the sub cell according to the mura compensation data.

In some embodiments, the pixel offset amount is determined based on an offset distance measured after the main cell is fitted with the sub cell and a size of a single pixel in the main cell or the sub cell.

In some embodiments, the offset distance is determined according to an alignment gap of at least one pair of alignment marks arranged in the main cell and the sub cell, respectively, after the main cell is fitted with the sub cell.

In some embodiments, when there are multiple pairs of alignment marks is located in the main cell and the sub cell, the offset distance is an average offset distance determined by the multiple pairs of alignment marks.

In some embodiments, data displayed by pixels in the first display area and the second display area that are orthogonally projected outside the actual display area is black.

In some embodiments, the mura compensation data is obtained by adjusting, according to the pixel offset amount, at least one of the first display area and the second display area.

In some embodiments, at least one of the main cell and the sub cell includes auxiliary pixels, the auxiliary pixels are arranged around a display area of the corresponding cell, and the actual display area is either the first display area or the second display area.

In some embodiments, in a condition that the actual display area is the first display area, the control plate is further configured to reset an actual display area of the sub cell based on a size of the first display area and the pixel offset amount, such that pixels, orthographic projections of which are in the first display area, of the sub cell are used as pixels in the actual display area of the sub cell.

In some embodiments, in a condition that the actual display area is the second display area, the control plate is further configured to reset an actual display area of the main cell based on a size of the second display area and the pixel offset amount, such that pixels, orthographic projections of which are in the second display area, of the main cell are used as pixels in the actual display area of the main cell.

In some embodiments, the control plate is further configured to control the sub cell to blur a location corresponding to a boundary appearing in the actual display area.

In some embodiments, the pixel offset amount includes a first sub-pixel offset amount along a first direction and a second sub-pixel offset amount along a second direction; wherein the first direction intersects the second direction.

In some embodiments, the first sub-pixel offset amount is a quotient of an offset distance of the main cell and the sub cell in the first direction divided by a length of a single pixel in the first direction.

In some embodiments, the second sub-pixel offset amount is a quotient of an offset distance of the main cell and the sub cell in the second direction divided by a length of a single pixel in the second direction.

In some embodiments, when the first sub-pixel offset amount or the second sub-pixel offset amount is less than a set threshold, data of pixels at an edge of the actual display area in the BD cell is displayed directly; when the first sub-pixel offset amount or the second sub-offset amount is greater than or equal to the set threshold, data of pixels at the edge of the actual display area in the BD cell is displayed after being processed by edge blurring or gradient insertion.

In a second aspect, an embodiment of the disclosure provides a manufacturing method of the BD cell display panel according to the first aspect, including: setting a first alignment mark on a non-display area of the main cell and a second alignment mark opposite to the first alignment mark on a same location on a non-display area of the sub cell, wherein the first alignment mark and the second alignment mark are aligned to form a complete mark; fitting the main cell and the sub cell and collecting an offset distance of the first alignment mark relative to the second alignment mark; calculating the pixel offset amount based on the offset distance and a size of a single pixel in the main cell or the sub cell, and storing the pixel offset amount; during an optical demura adjusting and testing phase, obtain the actual display area of the BD cell display panel by adjusting at least one of the first display area of the main cell and the second display area of the sub cell according to the pixel offset amount; and acquiring mura data of the actual display area and determining mura compensation data according to the mura data and data displayed in the actual display area and storing the mura compensation data.

In a third aspect, an embodiment of the disclosure provides a driving method of the BD cell display panel according to the first aspect, including: reading the pixel offset amount and the mura compensation data stored in the XPCBA; determining actual display areas of the main cell and the sub cell according to the pixel offset amount; and compensating the actual display areas of the main cell and the sub cell, respectively, according to the mura compensation data, obtaining and displaying compensated images to be displayed corresponding to the main cell and the sub cell.

In a fourth aspect, an embodiment of the disclosure provides a BD cell display device including the BD cell display panel as described in the first aspect.

DETAILED DESCRIPTION OF THE EMBODIMENTS

Embodiments of the present disclosure provide a BD cell display panel, a manufacturing method and a driving method thereof, and a display device to solve the above technical problems.

In order that the above objectives, features and advantages of the present invention can be more clearly understood, the disclosure will be further explained below in conjunction with the accompanying drawings and embodiments. However, example embodiments can be implemented in a variety of forms and should not be construed as being limited to the embodiments set forth herein; rather, these embodiments are provided so that the disclosure is more comprehensive and complete and the idea of example embodiments is fully conveyed to those skilled in the art. In the drawings, same reference numerals denote identical or similar structures and thus repetitive descriptions thereof will be omitted. The words for expressing position and direction described in the present disclosure are described by taking the attached drawings as an example, but changes can be made according to needs, and all the changes are included in the protection scope of the present disclosure. The drawings of the present disclosure are used only for illustration of relative positional relations and do not represent true proportions.

It should be noted that specific details are set forth in the following description in order to provide a thorough understanding of the disclosure. However, the present disclosure can be implemented in many other ways than those described herein, and those skilled in the art can similarly generalize without departing from the scope of the present disclosure. Accordingly, the disclosure is not to be limited by the specific embodiments disclosed below. Subsequent description of the specification is intended to be preferred embodiments for carrying out the present disclosure, but the description is intended to illustrate the general principles of the disclosure and is not intended to limit the scope of the disclosure. The scope of protection of this disclosure shall be as defined in the appended claims.

During the production of panels, especially panels of a large size, due to limitations in the production equipment or panel design, a bulk mura is often created, which is difficult to overcome by process optimization. To reduce the appearance of mura in display panels, Demura technology is typically used.

Since the BD cell employs a two-layer liquid crystal screen design (i.e., two screens, i.e., a main cell and a sub cell, which are stacked are used together), the BOE Dual cell can be manufactured into a larger size than an Organic Light-Emitting Diode (OLED) screen, and the display effect is comparable to the OLED display screen, and is thus widely used in large-size screens.

However, in the related art, the main and sub cells are affected by the fitting accuracy when they are fitted, hence, a deviation is inevitable, and it is difficult to adjust the deviation in process. Under calculation with a fitting accuracy of about 300 μm, for a 43 inch Ultra High Definition (UHD) display screen with the length and width of one pixel being 80×240 μm, the fitting accuracy of 300 μm has a deviation of about 3 to 4 pixels (300/80=3.75) in the H direction, and a deviation of about 1 to 2 pixels (300/240=1.25) in the V direction.

As such, misalignment of fitting of the main cell and the sub cell may directly causes display misalignment of display of the main and the sub cells, resulting in not only edge blur ghosting, lag, or severe sawtooth sensation of the final displayed image, but also an increase in the original mura, which affects the user experience.

Demura belongs in nature to optical compensation of external compensation, mainly by extracting the brightness signal by means of optical Charge Coupled Device (CCD) photography when the cell of the display panel is lit, generating a backward compensation Look-Up-Table (LUT), storing the LUT in a Flash memory, and back-compensating the relevant brightness data by a control plate (TCON) in the display panel according to the LUT after the display panel is turned on. In general, the higher the optical detection accuracy of the Demura, the smaller the generated Block pixel corresponding to the compensation table, and the better smoothing and compensation can be done in the demura process.

However, as the detection accuracy is improved, the hardware design (including TCON IC design, optical detection generation, storage capacity of LUT) will increase substantially, resulting in a large increase in cost. At the same time, the loading of a large capacity LUT results in poor user experience on the software, such as slow read speed, long on-load time, and the like. Taking a block precision from 4×4 pixels to 2×2 pixels as an example, the storage capacity of a single compensation table needs to be increased by 4 times, and taking a complete compensation table that requires at least 3 gray scales as an example, the total storage capacity of the LUT needs to be increased by 12 times, and the corresponding storage capacity and load time also need to be increased in this way.

Figure 1:
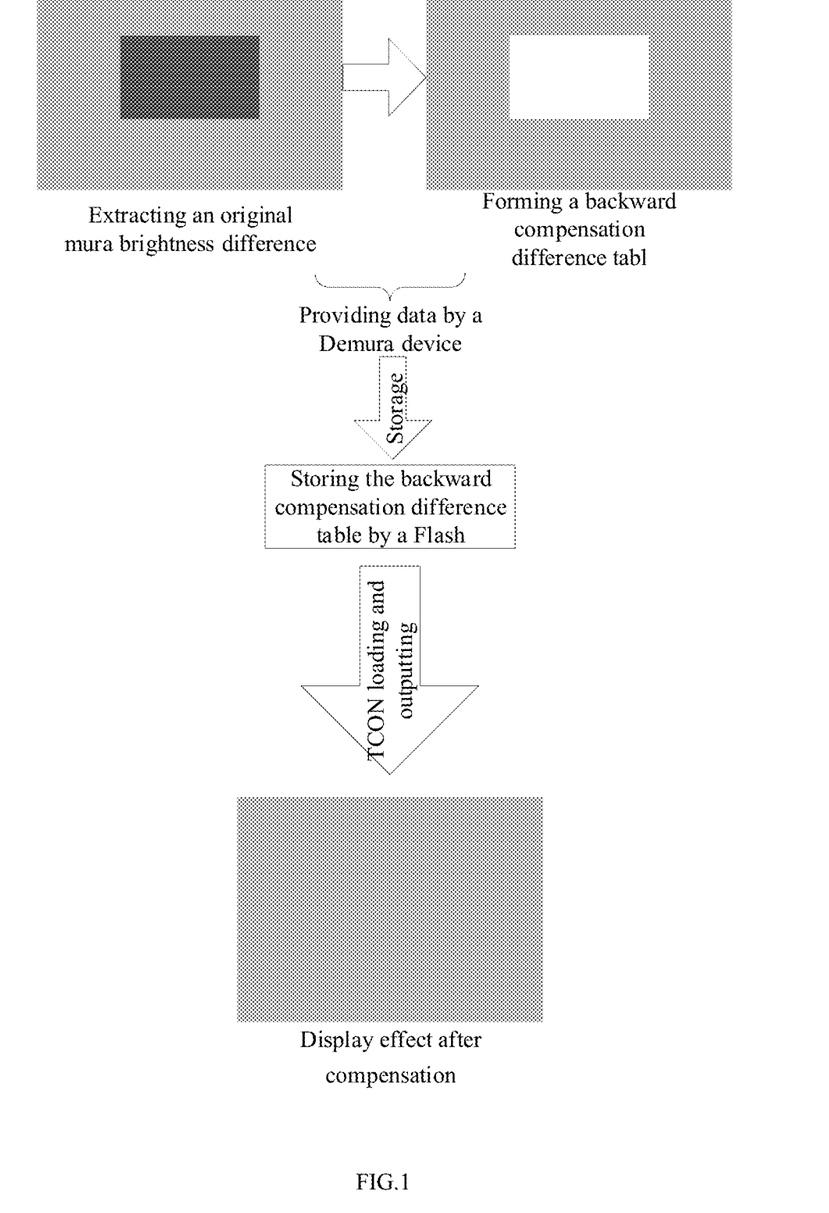
FIG. 1 is a schematic diagram of Demura compensation.

Please refer to FIG. 1 which is a schematic diagram of Demura compensation. The basic principle of generation of the LUT of Demura is to bring the brightness of other areas closer towards the brightness of the central area based on the principle that the brightness of the central area is invariant (smoothing, achieving uniformity in display of the whole image). In the optical demura adjusting and testing phase, a display panel is lit, an image displayed by the display panel is captured, the original mura brightness difference is extracted, and a backward compensated difference table is formed with a demura technique. The Demura device provides data (i.e. backward compensation difference table) for the Flash in the display panel and the Flash stores the backward compensation difference table. When the display panel displays an image, the TCON in the display panel reads out the backward compensation difference table from the Flash, loads data corresponding to the image for demura processing, and outputs the processed image to the display screen for display. After demura processing, the image displayed by the display screen does not appear mura (i.e., the display effect is that brightness unevenness does not appear after compensation).

Figure 2:
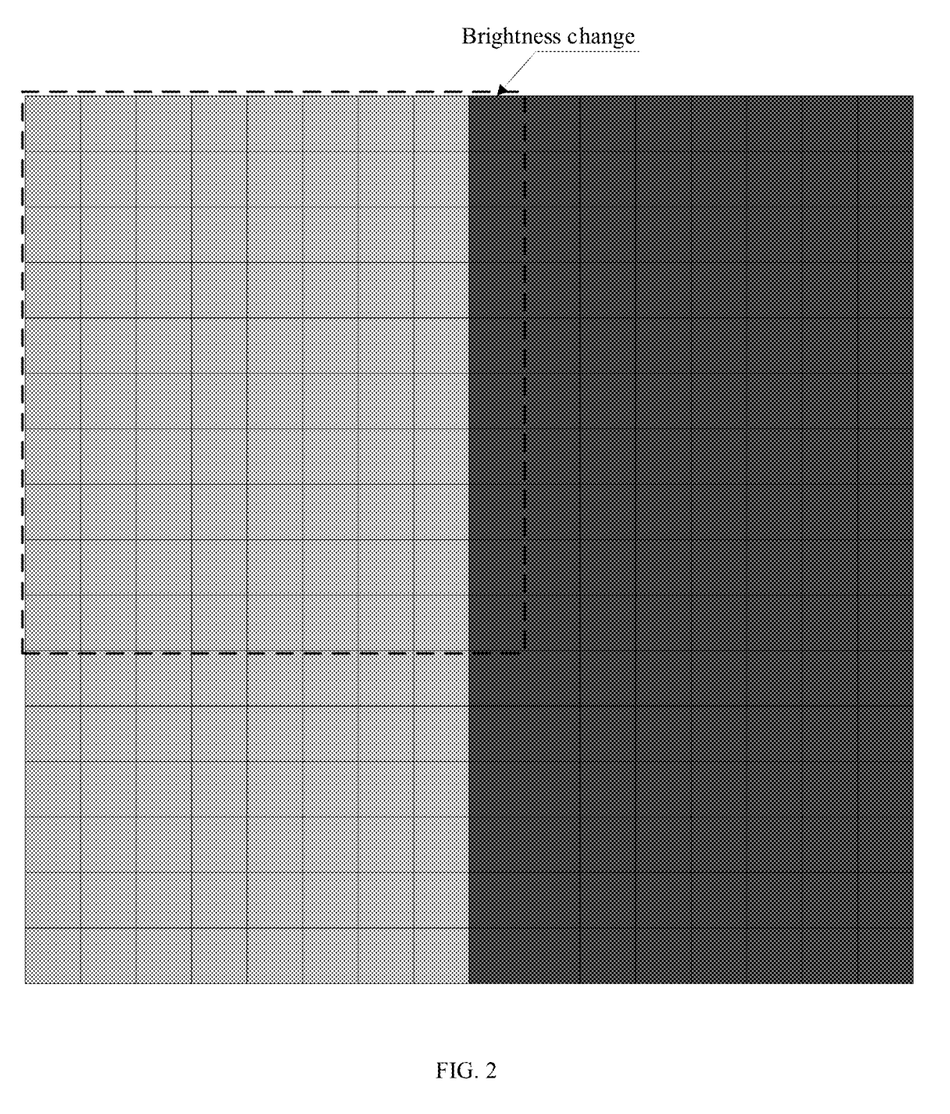
FIG. 2 is a schematic diagram of Mura brightness abrupt change distribution not within a single detection compensation accuracy unit.

FIG. 2 is a schematic diagram of Mura brightness abrupt change distribution not within a single detection compensation accuracy unit. The dashed box shown in FIG. 2 is a single detection compensation accuracy unit, and based on the compensation principle described above, when the Mura brightness abrupt distribution is within each detection compensation accuracy unit, it is possible to really react to its brightness and generate abrupt steps, which can be well backward compensated to better results with the method described above. As shown in FIG. 2, when the mura brightness abrupt change is not within a single compensation unit, based on the principle that center brightness is invariant, this brightness abrupt change (the dark portion on the left side of the dashed box in FIG. 2) will be averaged out by the brightness without abrupt change within the detection compensation accuracy unit (the light portion on the left side of the dashed box), the Demura algorithm will take as reference the average brightness within the detection compensation unit, the LUT table generated will not be able to feed back the actual brightness distribution, and the demura system will not be able to compensate back accordingly.

Figure 3:
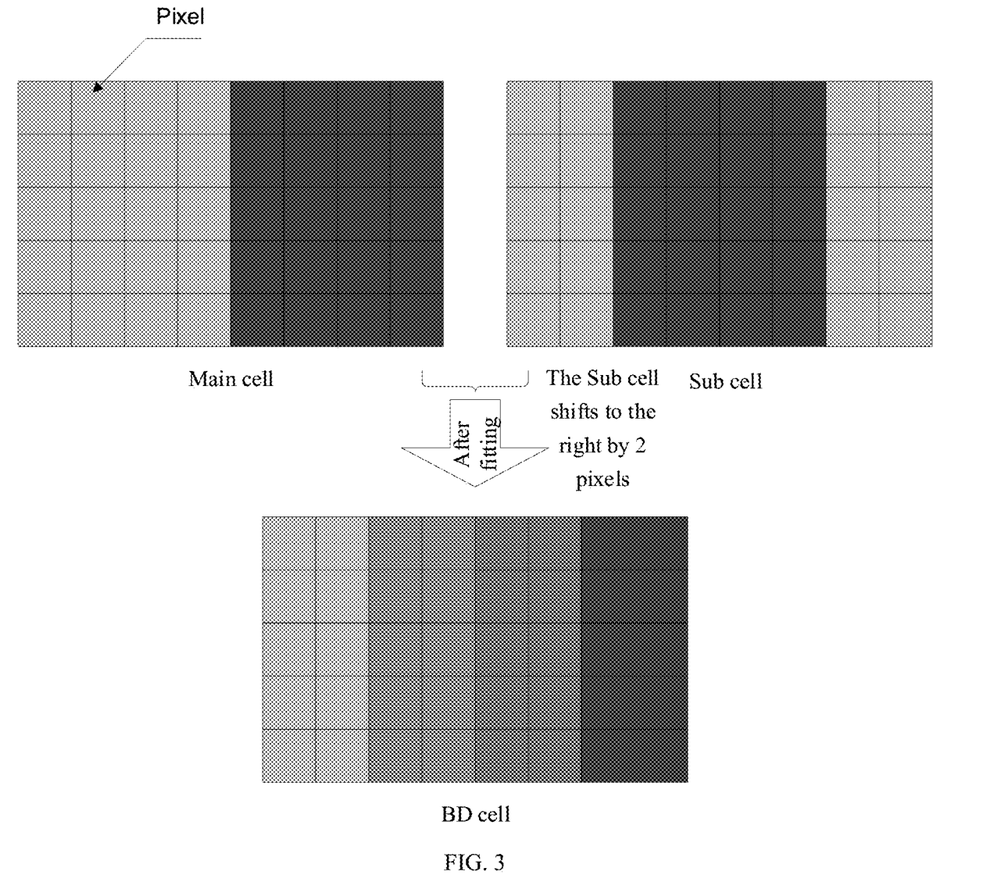
FIG. 3 is a schematic diagram of mura diffusion in a BD cell according to some embodiments of the present disclosure.
Figure 4:
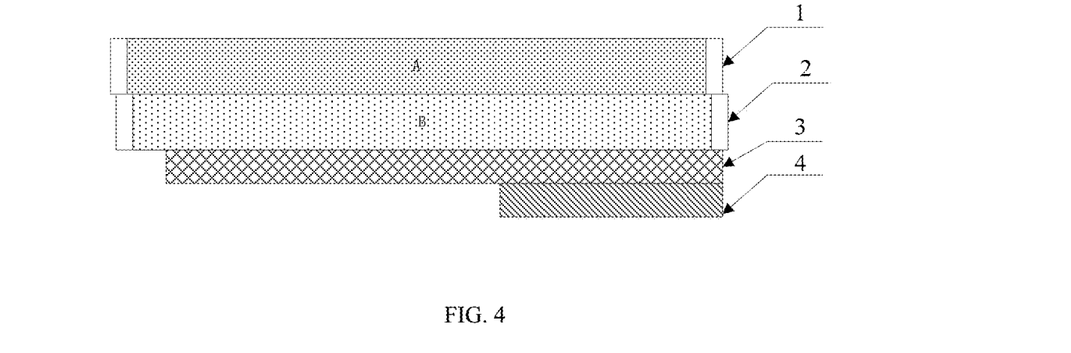
FIG. 4 is a schematic structure diagram of a BD cell display panel according to some embodiments of the present disclosure.

When the compensation method described above is applied to the BD cell, the mura in the BD cell is spread due to the alignment shift of the BD cell. FIG. 3 is a schematic diagram of mura diffusion in a BD cell according to some embodiments of the present disclosure. Assuming that there is a through-splicing mura of 4-pixel width in the BD cell, the size of a single detection compensation precision unit is 4×4 pixels. Since the fitting of the main cell and the sub cell in the BD cell shifts by 2 pixels (e.g., the sub cell shifts to the right by 2 pixels, and the sub cell in FIG. 4 is a sub cell that before shifting to the right by 2 pixels), four different overlaid blocks (four different brightness areas) are formed in the fit BD cell, which leads to the condition that the size of a single detection compensation accuracy unit requires at least 2×2 pixels to handle. According to the above method of calculating the compensation capacity table, it is necessary to increase resources by 12 times to achieve better compensation effect.

In order to solve the above-mentioned problems present in the BD cell, the present disclosure adopts the following solution.

The following is a detailed description of a BD cell display panel, a manufacturing method, a driving method thereof and a display device provided by the embodiments of the disclosure in conjunction with the drawings.

FIG. 4 is a schematic structure diagram of a BD cell display panel according to some embodiments of the present disclosure.

The BD cell display panel includes a main cell 1 and a sub cell 2 which are stacked, the main cell 1 including a first display area A and the sub cell 2 including a second display area B. The BD cell display panel further includes an XPCBA plate 3 and a control plate 4.

The XPCBA plate 3 is arranged on a side of the sub cell 2 away from the main cell 1, is bound to the main cell 1 and the sub cell 2 by Chip On Film (COF) (not shown in FIG. 4), and stores an pixel offset amount and mura compensation data. For example, the XPCBA plate 3 may include a storing circuit, e.g., an flash integrated circuit (IC), to store the above data. The pixel offset amount is the quantity of pixels misaligned by the first display area A with the second display area B after the main cell 1 is fitted with the sub cell 2, and the mura compensation data is data that compensates for mura in the main cell 1 and the sub cell 2.

The control plate 4 is configured to read the pixel offset amount and the mura compensation data from the XPCBA plate 3, and adjust at least one of the first display area A and the second display area B according to the pixel offset amount, thus causing pixels in the first display area A and the second display area B that are orthogonally projected within an actual display area of the BD cell display panel to be displayed, and compensating for mura in the main cell 1 and the sub cell 2 according to the mura compensation data.

For example, the second display area B of the sub cell 2 can be adjusted according to the first display area A of the main cell 1 and a part of the second display area B that is orthogonally projected into the first display area A is the actual display area of the sub cell 2, and the first display area A is the actual display area of the BD cell.

The first display area A of the main cell 1 can be adjusted according to the second display area B of the sub cell 2 and a part of the first display area A that is orthogonally projected into the second display area B is the actual display area of the main cell 1, and the second display area B is the actual display area of the BD cell.

The first display area A and the second display area B of the main cell 1 can also be adjusted at the same time to have the overlaid partial display areas of the first display area A and the second display area B as the actual display areas of the main cell 1 and the sub cell 2, i.e., the actual display area of the BD cell.

Since the quantity of pixel misalignment (i.e., pixel offset amount) between the first display area A and the second display area B after the main cell 1 and the sub cell 2 are fitted and mura compensation data are simultaneously stored in the stacked XPCBA plate 3, by adjusting at least one of the first display area A and the second display area B through reading the pixel offset amount from the XPCBA plate 3 by the control plate 4, pixels in the first display area A and the second display area B that are orthogonally projected within the actual display area of the BD cell display panel are displayed when the BD cell displays. Therefore the pixels in the same positions of the main cell 1 and the sub cell 2 that are orthogonally projected within the actual display area are synchronously displayed with the same content while the mura data of the main cell 1 and the sub cell 2 is compensated according to the mura compensation data, thereby eliminating the mura present in the BD cell. The mura data of the main cell or the sub cell refers to the display data of the region with the mura in the main cell or the sub cell.

Furthermore, since the pixels in the same positions of the main cell 1 and the sub cell 2 that are orthogonally projected within the actual display area synchronously display the same content, thus, when compensating the mura data in the main cell 1 and the sub cell 2 according to the mura compensation data, the accuracy of the original detection compensation unit can be maintained, thereby enabling the elimination of mura in the BD cell without added resources, thus reducing costs while eliminating mura in the BD cell as compared to the related art.

In the embodiment provided herein, the pixel offset amount is determined based on an offset distance measured after the main cell 1 is fitted with the sub cell 2 and a size of a single pixel in the main cell or the sub cell.

The offset distance is determined according to an alignment gap of at least one pair of alignment marks arranged in the main cell 1 and the sub cell 2, respectively, after the main cell 1 is fitted with the sub cell 2.

Figure 5:
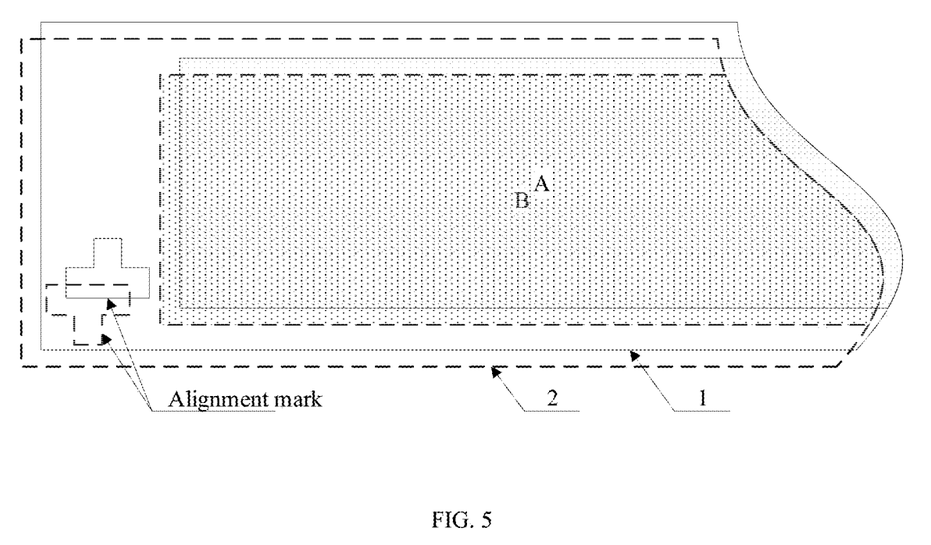
FIG. 5 is a schematic diagram of the main cell and the sub cell after fitting according to some embodiments of the present disclosure.
Figure 6:
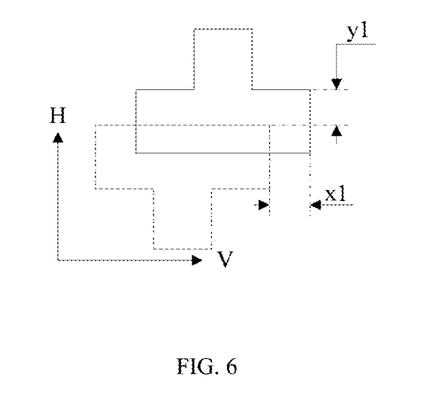
FIG. 6 is a schematic diagram of offset distance measurement according to some embodiments of the present disclosure.

For example, please refer to FIG. 5 which is a schematic diagram of the main cell and the sub cell after fitting according to some embodiments of the present disclosure, and FIG. 6 which is a schematic diagram of offset distance measurement according to some embodiments of the present disclosure.

Same positions of the main cell 1 and the sub cell 2 in FIG. 5 are each provided with an alignment mark. When the main cell 1 and the sub cell 2 are fully aligned, the alignment marks of the main cell 1 and the sub cell 2 can form a complete graphic (referred to herein as one pair of alignment marks). As shown in FIG. 5, the alignment mark of the main cell 1 is the upper half of the "cross" shape and the alignment mark of the corresponding sub cell 2 is the lower half of the "cross" shape. When the main cell 1 and the sub cell 2 are misaligned with each other after fitting, the post-fitting offset distance of the main cell 1 and the sub cell 2 can be determined by capturing the graphic of the fitted main cell 1 and sub cell 2 provided with alignment marks by the optical microscopy system. As shown in FIG. 6, the offset distance in the V direction being x1 and the offset distance in the H direction being y1 can be measured.

In the embodiment provided herein, the pixel offset amount includes a first sub-pixel offset amount along a first direction V and a second sub-pixel offset amount along a second direction H; wherein the first direction V intersects the second direction H.

The first sub-pixel offset amount is a quotient of an offset distance of the main cell and the sub cell in the first direction divided by a length of a single pixel in the first direction.

The second sub-pixel offset amount is a quotient of an offset distance of the main cell and the sub cell in the second direction divided by a length of a single pixel in the second direction.

After determining the offset distance between fitted the main cell 1 and the sub cell 2, the pixel offset amount can then be determined based on the size of one pixel. For example, for the determination of the pixel offset amount of the sub cell 2 relative to the main cell 1, the size of one pixel in the sub cell (i.e., the length x2 of the pixel in the V direction and the length y2 in the H direction) can be determined first, and then a first sub-pixel offset amount in the V direction (quotient or round of x1/x2) and a second sub-pixel offset amount in the H direction (quotient or round of y1/y2) can be calculated, respectively. If only one pair of alignment marks as shown in FIG. 6 is provided in the main cell 1 and the sub cell 2, then the pixel offset amount is directly noted as the pixel offset amount for the main cell 1 and the sub cell 2. A similar approach can be taken to determine the pixel offset amount of the main cell 1 relative to the sub cell 2, which will not be repeated here.

When there are multiple pairs of the alignment marks in the main cell 1 and the sub cell 2, the offset distance is the average offset distance determined by the multiple pairs of alignment marks. For example, when 3 pairs of alignment marks each as shown in FIG. 6 are provided at different locations in the main cell 1 and the sub cell 2, the method of calculating the offset distances shown in FIG. 6 is used to measure the offset distances in the H-direction and V-direction corresponding to each pair of alignment marks, then the average of the offset distances corresponding to the 3 pairs of alignment marks in the H direction and the average of the offset distances corresponding to the 3 pairs of alignment marks in the V direction are taken as the offset distance between the main cell 1 and the sub cell 2, and finally the first sub-pixel offset amount and the second sub-pixel offset amount are calculated according to the above method for calculating pixel offset amounts and are used as the pixel offset amount for the main cell 1 and the sub cell 2.

In the embodiment provided herein, the display data of pixels in the first display area A and the second display area B that are orthogonally projected outside the actual display area is data corresponding to black. When the pixels of the first display area A and the pixels of the second display area B outside the actual display area of the BD cell are set to black, they can be used as a black frame of the BD cell without affecting normal display.

In the embodiment provided herein, the mura compensation data is obtained by adjusting, according to the pixel offset amount, at least one of the first display area A and the second display area B.

For example, in the optical demura adjusting and testing phase, the pixel offset amount previously measured may be pre-loaded for BD cell display, when the display image is output, the display image may be shifted according to the pixel offset amounts in the H direction and the V direction, respectively so as to keep the contents displayed by the main cell and the sub cell is not misaligned with each other in good spatial position to the maximum extent; The mura compensation data is then testing on the basis of the alignment corrected state by using Demura technique, the specific LUT is output, and the LUT is burned and stored together with the pixel offset amount in the Flash IC of the XPCBA plate.

Taking FIG. 3 as an example, since the sub cell is offset by 2 pixels, the resources required by the demura technology in the related art should be increased by 12 times. In the present disclosure, the first display area A of the main cell 1 and the second display area B of the sub cell 2 are aligned in terms of their display contents by the pixel offset amount, and then Demura technology is used to achieve the same processing effect as the Demura technology with the resources being increased by 12 times in the related art while maintaining the original Demura accuracy.

In some embodiments provided herein, when the first sub-pixel offset amount or the second sub-pixel offset amount is less than the set threshold, the data of pixels at an edge of the actual display area in the BD cell is displayed directly; when the first sub-pixel offset amount or the second sub-offset amount is greater than or equal to the set threshold, the data of pixels at the edge of the actual display area in the BD cell is displayed after being processed by edge blurring or gradient insertion.

When the first sub-pixel offset amount or the second sub-offset amount is less than a set threshold, less data is missing from pixels at the edge in the H direction or the Y direction, resulting in a smaller data difference, the display can be performed directly; when the first sub-pixel offset amount or the second sub-offset amount is greater than or equal to the set threshold, more data is missing from pixels at the edge in the H direction or the Y direction, resulting in a larger data difference, and the data of the pixels at the edge needs to be displayed after being processed by edge blurring or gradual insertion.

When the data difference of the pixels at the edge is large, since only the data of the pixels at the edge is processed, a large processing burden is not increased, and display of the processed pixels at the edge is not obtrusive, thereby enabling an effective improvement in display effect.

In some embodiments provided herein, at least one of the primary cell 1 and the sub cell 2 includes auxiliary pixels disposed around a display area of the corresponding cell, the actual display area of the BD cell being the first display area A or the second display area B.

Figure 7:
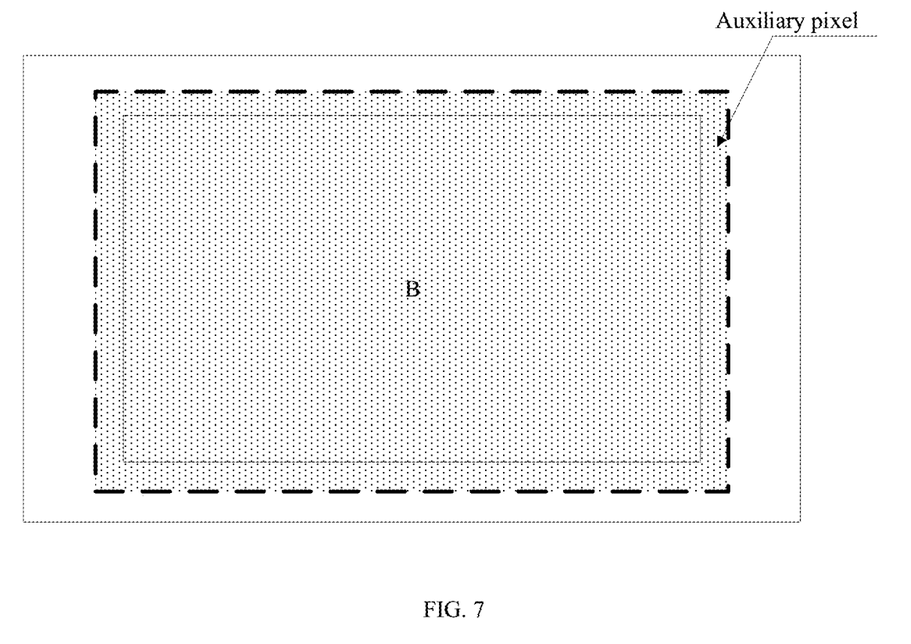
FIG. 7 is a schematic diagram of a sub cell according to some embodiments of the present disclosure.
Figure 8:
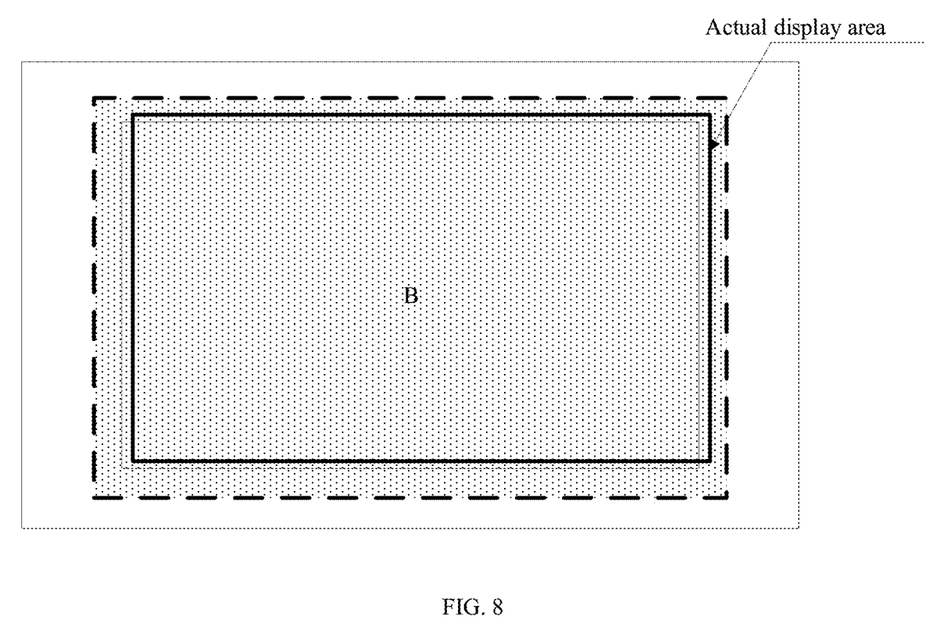
FIG. 8 is a schematic diagram of an actual display area of a sub cell according to some embodiments of the present disclosure.

For example, please refer to FIG. 7 which is a schematic diagram of a sub cell according to some embodiments of the present disclosure, and FIG. 8, which is a schematic diagram of an actual display area of a sub cell according to some embodiments of the present disclosure.

A plurality of auxiliary pixels are provided around the second display area B of the sub cell 2 (provided between the second display area B and an area enclosed by a dashed line in FIG. 7), in this way, when the first display area A serves as the actual display area of the BD cell, the actual display area of the sub cell 2 may be reset such that the auxiliary pixels of the sub cell 2 that are orthogonally projected into the first display area A are displayed as pixels in the actual display area of the sub cell 2 (illustrated in FIG. 8 by the area enclosed by thick solid lines), while pixels outside the actual display area of the sub cell 2 display data corresponding to black.

Similarly, the auxiliary pixels may be provided around the first display area of the main cell 1 and the actual display area of the main cell 1 may be reset, in which case the second display area B of the sub cell 2 is used as the actual display area of the BD cell.

In the embodiment provided herein, the control plate 4 is further configured to reset the actual display area of either the main cell 1 or the sub cell 2, depending on the size of the actual display area of the BD cell and the pixel offset amount, so that the auxiliary pixels, the orthographic projection of which are in the actual display area, of the corresponding cell are used as pixels in the actual display area.

For example, continuing with FIG. 7 as an example, it is assumed that the sub cell 2 is offset from the main cell 1 by 2 pixels in the V direction and 3 pixels in the H direction, the control plate 4 can then take 2 columns of auxiliary pixels in the V direction according to the pixel offset amount described above, and takes 3 rows of auxiliary pixels in the H direction as pixels in the actual display area, and arrange pixels in the second display area B which are not in the actual display area of the BD cell and auxiliary pixels which are not in the actual display area to black-displaying data as a frame of the display panel of the BD cell.

Similarly, the control plate 4 resets the actual display area of the main cell 1 in a similar manner and will not be repeated.

In the embodiment provided herein, the control plate 4 is further configured to control the sub cell 2 to blur the location corresponding to the boundary line occurring in the actual display area.

Figure 9:
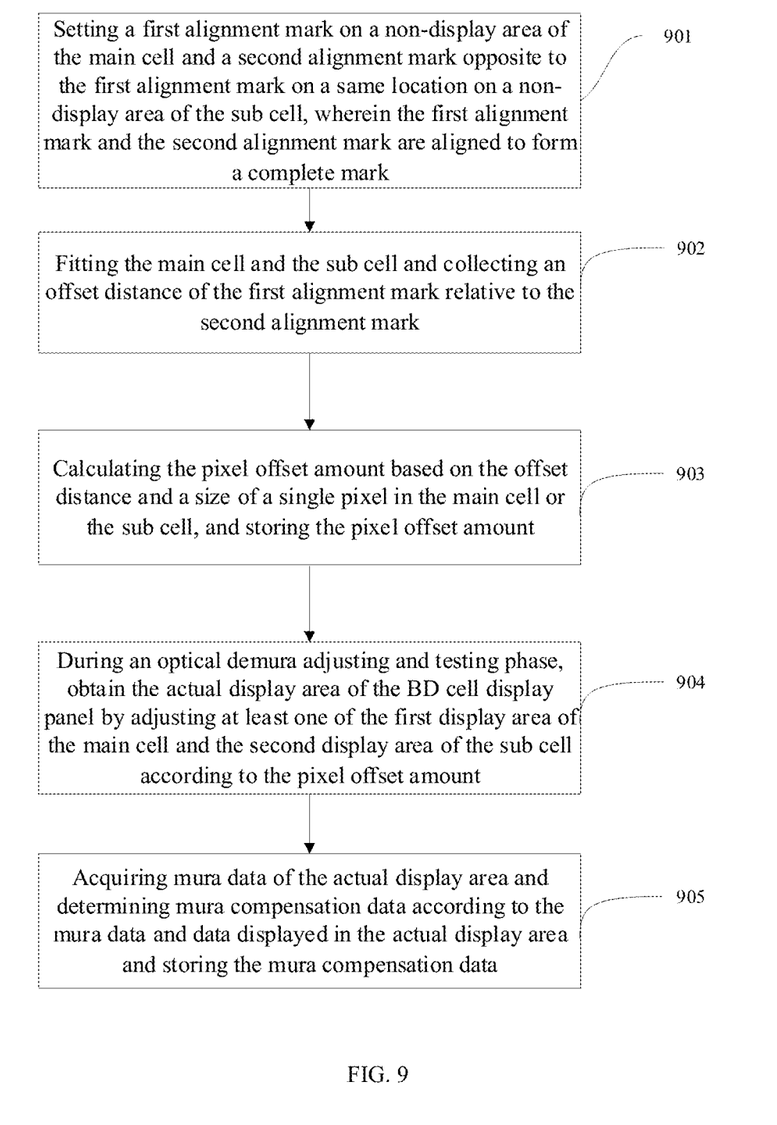
FIG. 9 illustrates a manufacturing method of a BD cell display panel according to some embodiments of the present disclosure.

Based on the same inventive concept, an embodiment of the present disclosure provides a manufacturing method of the BD cell display panel, for the specific implementation of the manufacturing method, please refer to the description of the embodiment section of the BD cell display panel, and repeated details thereof will not be repeated, please refer to FIG. 9, the method including the following.

Step 901: a first alignment mark on a non-display area of the main cell and a second alignment mark opposite to the first alignment mark on a same location on a non-display area of the sub cell are arranged, wherein the first alignment mark and the second alignment mark are aligned to form a complete mark.

Step 902: the main cell and the sub cell are fitted and an offset distance of the first alignment mark relative to the second alignment mark is collected.

Step 903: the pixel offset amount is calculated based on the offset distance and a size of a single pixel in the main cell and the sub cell, and the pixel offset amount is stored.

Step 904: during an optical demura adjusting and testing phase, at least one of the first display area of the main cell and the second display area of the sub cell is adjusted according to the pixel offset amount to obtain the actual display area of the BD cell display panel.

Step 905: mura data of the actual display area is acquired and mura compensation data is determined according to the mura data and the data displayed in the actual display area and the mura compensation data is stored.

Figure 10:
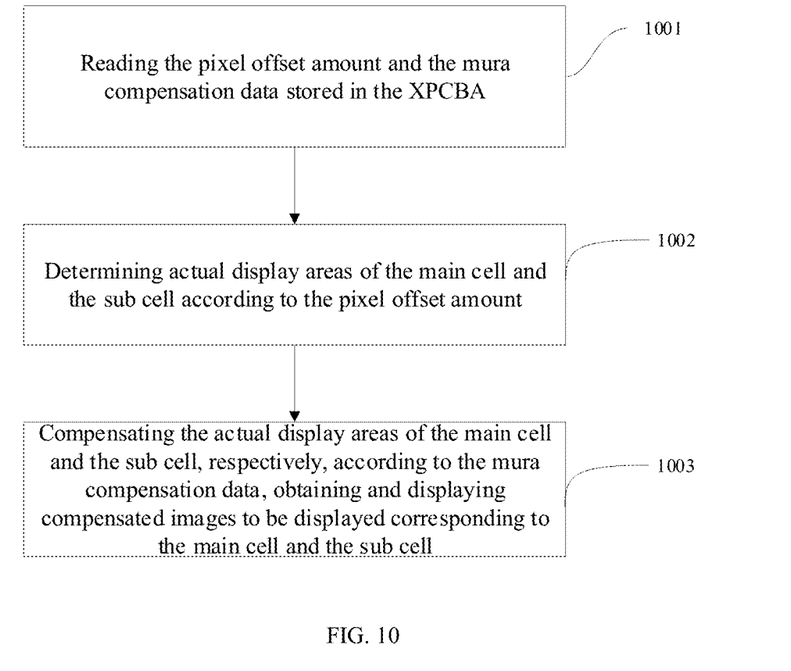
FIG. 10 illustrates a driving method of a BD cell display panel according to some embodiments of the present disclosure.

Based on the same inventive concept, an embodiment of the present disclosure provides a driving method of the BD cell display panel, for the specific implementation of the driving method, please refer to the description of the embodiment section of the BD cell display panel, and repeated details thereof will not be repeated, please refer to FIG. 10, the method including the following.

Step 1001: an pixel offset amount and the mura compensation data stored in the XPCBA are read.

Step 1002: actual display areas of the main cell and the sub cell are determined according to the pixel offset amount.

Step 1003: the actual display areas of the main cell and the sub cell are compensated respectively according to the mura compensation data, compensated images to be displayed corresponding to the main cell and the sub cell are obtained and displayed.

Based on the same inventive concept, the embodiment of the present disclosure provides a BD cell display device including the BD cell display panel as described above.

The display device can be a display device such as a liquid crystal display, a liquid crystal display screen, or a liquid crystal television.

Although the preferred embodiments of the present disclosure have been described, additional changes and modifications may be made to these embodiments once the basic inventive concepts are known to those skilled in the art. Therefore the appended claims are intended to be interpreted to encompass preferred embodiments as well as all modifications and modifications falling within the scope of the present disclosure.

It will be apparent to those skilled in the art that various modifications and variations can be made to the present disclosure without departing from the spirit and scope of the disclosure. Thus, it is intended that the present disclosure include such modifications and variations provided that they fall within the scope of the present claims and their equivalents.

What is claimed is:

1. A BOE Dual cell (BD) cell display panel, comprising:
a main cell, comprising a first display area;
a sub cell, stacked on the main cell, wherein the sub cell comprising a second display area;
an X-printed circuit board assembly (X-PCBA) plate on a side of the sub cell away from the main cell, wherein the X-PCBA plate is bound with the main cell and the sub cell by a chip on film (COF), and stores a pixel offset amount and mura compensation data, the pixel offset amount is a quantity of pixels misaligned by the first display area with the second display area after the main cell is fitted with the sub cell, and the mura compensation data is data that compensates for mura in the main cell and the sub cell; and
a control plate, configured to read the pixel offset amount and the mura compensation data from the XPCBA plate, and adjust at least one of the first display area and the second display area according to the pixel offset amount, thus causing pixels in the first display area and the second display area that are orthogonally projected within an actual display area of the BD cell display panel to be displayed, and compensating for the mura in the main cell and the sub cell according to the mura compensation data.

2. The BD cell display panel according to claim 1, wherein the pixel offset amount is determined based on an offset distance measured after the main cell is fitted with the sub cell and a size of a single pixel in the main cell or the sub cell.

3. The BD cell display panel according to claim 2, wherein the offset distance is determined according to an alignment gap of at least one pair of alignment marks arranged in the main cell and the sub cell, respectively, after the main cell is fitted with the sub cell.

4. The BD cell display panel according to claim 3, wherein when multiple pairs of alignment marks is located in the main cell and the sub cell, the offset distance is an average offset distance determined by the multiple pairs of alignment marks.

5. The BD cell display panel according to claim 4, wherein the pixel offset amount comprises a first sub-pixel offset amount along a first direction and a second sub-pixel offset amount along a second direction; wherein the first direction intersects the second direction.

6. The BD cell display panel according to claim 3, wherein the pixel offset amount comprises a first sub-pixel offset amount along a first direction and a second sub-pixel offset amount along a second direction; wherein the first direction intersects the second direction.

7. The BD cell display panel according to claim 2, wherein the pixel offset amount comprises a first sub-pixel offset amount along a first direction and a second sub-pixel offset amount along a second direction; wherein the first direction intersects the second direction.

8. The BD cell display panel according to claim 7, wherein the first sub-pixel offset amount is a quotient of an offset distance of the main cell and the sub cell in the first direction divided by a length of a single pixel in the first direction.

9. The BD cell display panel according to claim 7, wherein the second sub-pixel offset amount is a quotient of an offset distance of the main cell and the sub cell in the second direction divided by a length of a single pixel in the second direction.

10. The BD cell display panel according to claim 7, wherein when the first sub-pixel offset amount or the second sub-pixel offset amount is less than a set threshold, data of pixels at an edge of the actual display area in the BD cell is displayed directly; when the first sub-pixel offset amount or the second sub-offset amount is greater than or equal to the set threshold, data of pixels at the edge of the actual display area in the BD cell is displayed after being processed by edge blurring or gradient insertion.

11. The BD cell display panel according to claim 1, wherein pixels in the first display area and the second display area that are orthogonally projected outside the actual display area is black.

12. The BD cell display panel according to claim 1, wherein the mura compensation data is obtained by adjusting, according to the pixel offset amount, at least one of the first display area and the second display area.

13. The BD cell display panel according to claim 1, wherein at least one of the main cell and the sub cell comprises auxiliary pixels, the auxiliary pixels are arranged around a display area of the corresponding cell, and the actual display area is the first display area or the second display area.

14. The BD cell display panel according to claim 13, wherein in a condition that the actual display area is the first display area, the control plate is further configured to reset an actual display area of the sub cell based on a size of the first display area and the pixel offset amount, such that pixels, orthographic projections of which are in the first display area, of the sub cell are used as pixels in the actual display area of the sub cell.

15. The BD cell display panel according to claim 14, wherein the control plate is further configured to control the sub cell to blur a location corresponding to a boundary appearing in the actual display area.

16. The BD cell display panel according to claim 13, wherein in a condition that the actual display area is the second display area, the control plate is further configured to reset an actual display area of the main cell based on a size of the second display area and the pixel offset amount, such that pixels, orthographic projections of which are in the second display area, of the main cell are used as pixels in the actual display area of the main cell.

17. The BD cell display panel according to claim 16, wherein the control plate is further configured to control the sub cell to blur a location corresponding to a boundary appearing in the actual display area.

18. A manufacturing method of the BD cell display panel according to claim 1, comprising:
setting a first alignment mark on a non-display area of the main cell and a second alignment mark opposite to the first alignment mark on a same location on a non-display area of the sub cell, wherein the first alignment mark and the second alignment mark are aligned to form a complete mark;
fitting the main cell and the sub cell and collecting an offset distance of the first alignment mark relative to the second alignment mark;
calculating the pixel offset amount based on the offset distance and a size of a single pixel in the main cell or the sub cell, and storing the pixel offset amount;
during an optical demura adjusting and testing phase, obtain the actual display area of the BD cell display panel by adjusting at least one of the first display area of the main cell and the second display area of the sub cell according to the pixel offset amount; and acquiring mura data of the actual display area and determining mura compensation data according to the mura data and data displayed in the actual display area and storing the mura compensation data.

19. A driving method of the BD cell display panel according to claim 1, comprising:

reading the pixel offset amount and the mura compensation data stored in the XPCBA;

determining actual display areas of the main cell and the sub cell according to the pixel offset amount; and compensating the actual display areas of the main cell and the sub cell, respectively, according to the mura compensation data, obtaining and displaying compensated images to be displayed corresponding to the main cell and the sub cell.

20. A BD cell display device, comprising the BD cell display panel according to claim 1.

* * * * *